F. D. HOWE 1,610,446

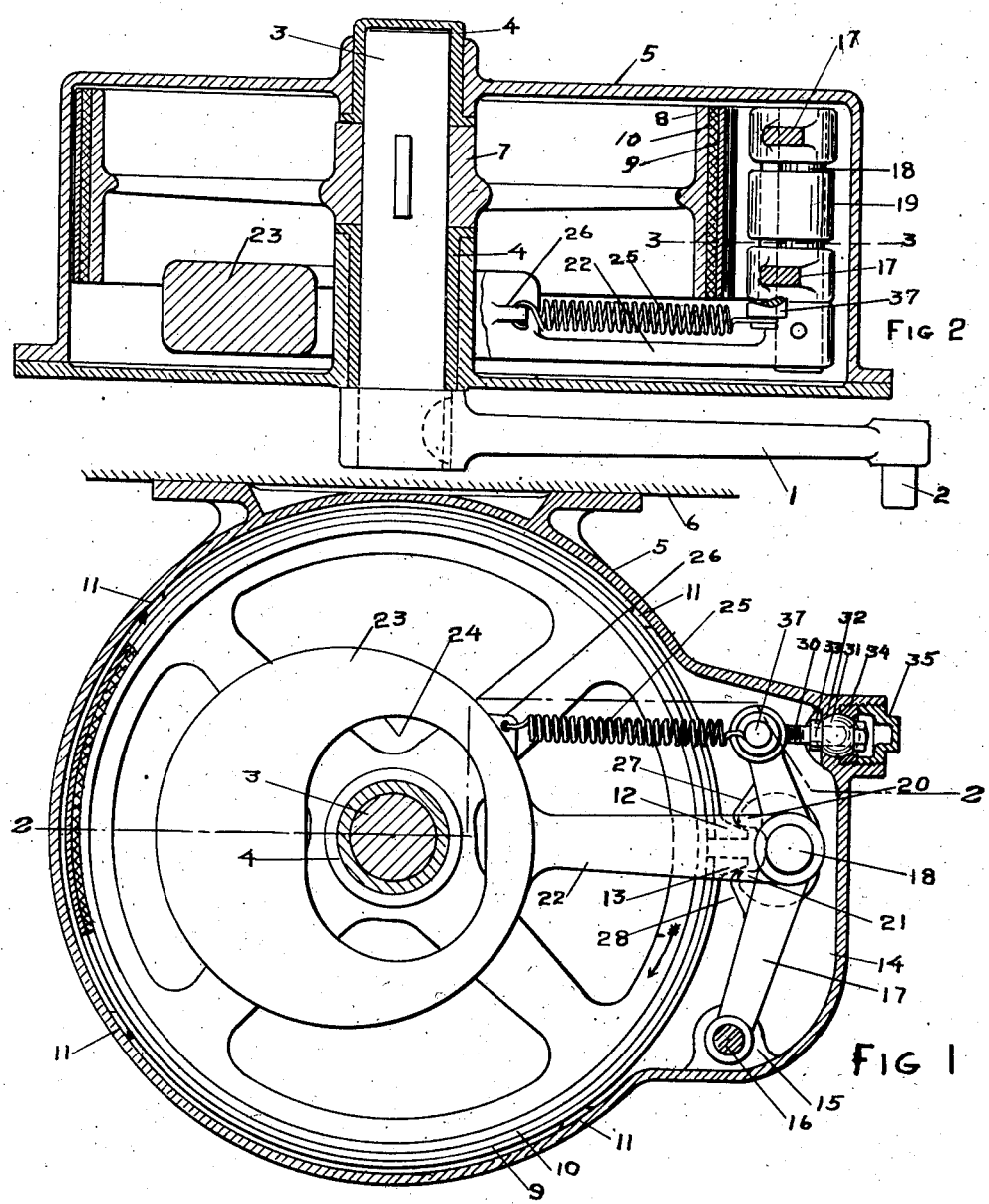
Dec. 14, 1926.
F. D. HOWE
SHOCK ABSORBER
Filed April 18, 1921      2 Sheets-Sheet 1
INVENTOR
Frank D. Howe
BY
ATTORNEY Dec. 14, 1926.

SHOCK ABSORBER

Filed April 18, 1921    2 Sheets-Sheet 2

INVENTOR
Frank D. Howe
BY C. P. Ely
ATTORNEY

Patented Dec. 14, 1926.

1,610,446

UNITED STATES PATENT OFFICE.

FRANK D. HOWE, OF KENT, OHIO.

SHOCK ABSORBER.

Application filed April 18, 1921. Serial No. 462,089.

This invention relates to that class of devices which are known as "shock absorbers" intended to be applied to vehicles, particularly to motor vehicles, the object of these devices being to deaden or retard the sharp vibrations and bouncing action of the vehicle as it goes over rough roads.

Many shock absorbers exist at the present time, but they possess disadvantages which it is the object of the present invention to remedy. The purpose of my invention is to construct a shock absorber which will allow a free action of the vehicle springs, so long as the body is not accelerating upward or downward at a rate which is uncomfortable to the passengers or injurious to the load carried.

A further purpose of my invention is to provide means by which a variable or differential braking action may be exerted on the vehicle in accordance with the violence of the jolt, and the relative motion of body and axle, so that the vehicle body will travel in as near a horizontal path as possible and so that, if the body is forced to rise or fall the movement will be smoothed out or made easy and the period of vibration of the vehicle suspension springs increased while the amplitude of oscillation of the vehicle body is reduced.

These and other objects are achieved by a simple and effective form of shock absorber such as shown and described herein, it being understood that the showing is an example merely and the invention is capable of embodiment in many different forms.

In the drawings:

Fig. 1 is a vertical elevation of the shock absorber, the casing being shown in section.
Fig. 2 is a view on line 2—2 of Figure 1 showing the brake drum in section.

Figures 3, 4:
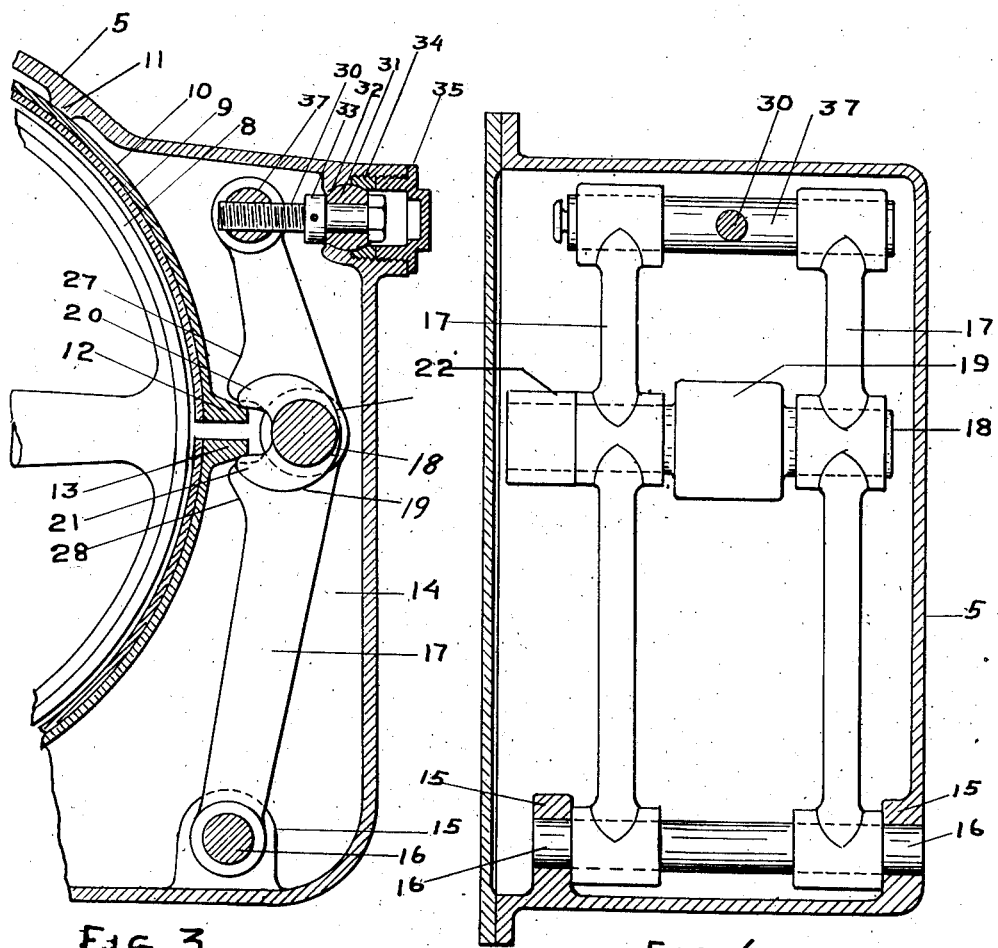
Fig. 3 is an enlarged section on the line 3—3 of Fig. 2.
Fig. 4 is a view of the swinging links, looking toward the left of Fig. 3 the casing being shown in section.

In the drawings 1 represents an arm or lever which is attached by any suitable means at its outer end 2 to the axle of the vehicle, (not shown). The arm 1 is keyed to a shaft 3 which is mounted in bearings 4 supported in a casing 5, attached to the underside of the vehicle body or chassis 6. It will be understood of course, that the chassis is supported on springs from the axles of the machine.

Centrally located and keyed to the shaft 3 is the hub 7 of a brake drum, 8 which is located concentrically with respect to the major portion of the casing 5. On the inside of the casing, about the brake drum is arranged a device to restrain the movement of the drum, here shown as a split brake band 9 which is normally expansible and which carries on its inner face, if desired, a friction lining 10. The brake band is supported on a number of lugs 11 and is arranged so that it is normally out of contact with the surface of the brake drum or pulley 8, and is unattached at any point so that it is free to move with the oscillating drum until it contacts certain abutments to be described later.

The ends of the band 9 are formed with lugs or flanges, the upper lug being designated by the numeral 12 and the lower lug by the numeral 13. The outer surfaces of these lugs are tapered or inclined as shown in Fig. 3. Around the lugs 12 and 13 the casing is provided with a chamber 14, and on the lower surface of the chamber are formed bearings 15 which support a shaft 16. On the shaft 16 and mounted so as to rock about the shaft, are angular arms or links 17, which extend upwardly into the chamber 14 past the lugs 12 and 13. At a point in the links opposite the lugs is rotatably mounted a shaft 18, which may be termed the cam shaft.

Secured to the shaft 18, midway between the links 17 is a cam 19 which is provided with two jaws or abutments 20 and 21, the upper jaw 20 lying adjacent the tapered surface of the lug 12 and the lower jaw 21 lying adjacent the tapered surface of the lug 13.

Secured to the end of the shaft 18 is an arm or lever 22, the outer end of which carries a weight 23 which may be termed an inertia weight. This weight may be located in any suitable position, it being here shown as passing around the shaft 3, an aperture 24 being provided so that the weight is free to move relative to the shaft 3. The weight is balanced and suspended by a spring 25 one end of which is attached to the weight at 26 and the other end of which is attached to the upper ends of one of the links 17. The spring and weight are so adjusted that the weight will normally lie or float in about the position shown in Fig. 1, in which position the jaws 20 and 21 of the cam 19 will embrace the lugs 12 and 13 but not exert any pressure thereon. The location of lugs 12, 13, 20, 21, 27 and 28 and levers 22 and 1 with relation to the centers of their respective shafts is important as will appear in the description of operation of the device.

On the links 17 are provided additional fingers or abutments 27 and 28, these abutments being above and below the lugs 12 and 13 and embracing them. The function of these lugs is to position the brake band 9 and to prevent its rotation.

The upper ends of the links 17 are joined by a pin 37, rotatably mounted in the levers. The center pin 37, the contacting points of lugs 12, 13, 27, 28, 20 and 21 and the center of pin 16, are substantially in the same plane. Into the center of pin 37 is threaded a screw 30 the end of which passes through a ball 31 in socket 32 in the casing 5, a collar 33 serving to hold the screw in position. A threaded ring 34 holds the ball in place, being locked by a threaded cap 36. By this means the upper ends of the links are held in position, the adjustment being for the purpose of taking up the wear on the brake band.

The action of the parts may be briefly summarized as follows:

During the running of the vehicle over smooth or only slightly rough roads, the shock absorber is inactive, that is the brake band is not exerting any force on the brake drum and the axle is free to respond to the road inequalities. Rapid acceleration of the body either upward or downward, causes the inertia weight to act upon the brake in a manner best explained by examining the various possible relative motions of axle and body. For example, a sudden upward movement of the chassis will cause the inertia weight 23, to lag behind bringing jaw 20 against brake band lug 12. If the chassis and axle are separating, brake drum 8 will be rotated in the direction indicated by the arrow in Fig. 1, and the brake band lug 13 will be brought into contact with abutments 28. Further rotation of the brake drum will then be resisted by the brake band acting according to the well known laws of wrapped brakes, by which the pressure exerted by the jaw 20 is multiplied many times in the pull exerted by the anchored end of the band, and the retarding force is nearly proportional to the violence with which the chassis is accelerated. When the rising chassis reaches the point at which vertical acceleration ceases and deceleration begins, or a little after this point due to the lag in the mechanism, the weight will pass to the other side of the center and the lower cam jaw or finger 21 will contact with the lug 13, and if the axle and chassis are still receding from each other and the brake drum therefore still rotating, in the direction indicated by the arrow in Fig. 1, the finger 21 now exerts only such relatively feeble pressure as is necessary to resist the action of the inertia weight so that the deceleration of the chassis is practically left to gravity. Since gravity acts upon the passenger or load the same as upon the chassis, the release of the friction device reduces the tendency which the passenger or load would otherwise have to bounce off the seat or floor at the top of the chassis movement, and also reduces the tendency to jerk the wheels off the ground which accompanies the use of the ordinary shock absorber or rebound straps and which, in the case of the rear axle causes injurious tire slippage.

At the top of the chassis movement, when downward acceleration begins the inertia weight is exerting its greatest upward pressure against the lug 13, and if the chassis is approaching the axle, the rotation of the brake drum will bring the lug 12 into contact with the abutment 27 whereupon a powerful braking action is again set up, due to the winding up of the brake band, which now retards the fall of chassis and load. As downward acceleration slows up or passes into deceleration, the brake action due to the winding up of the brake band is released and passes into the lighter brake action due to the pressure of the lower cam jaw 21 on the lug 13.

All of the actions which have been described are exactly those required to lengthen the period of vibration of the spring and give the comfort which may be obtained by very long springs with great latitude of up and down movement between the axle and the chassis. Similar analysis of the action of the device in all of the combinations of chassis acceleration and relative motion of chassis and axle will show that in all the action is the most favorable to easy riding. It is also apparent that if the lever 1, were to extend in the opposite direction, the brake would grip where it now acts lightly. The same is true of inertia weight 23. Proper relation of parts must be used to achieve the results desired.

While the description has been somewhat detailed, it will be understood that the description is such as is necessary to enable a full understanding of the invention and is not to be understood as limiting the scope of the invention, which is capable of other applications. As far as known to me I am the first to use an inertia weight as a means for obtaining a mechanically applied retarding pressure to prevent sudden and violent jolting or bouncing of a vehicle chassis. Also I am the first to use a rotating brake drum the oscillations of which are set up by the separation of the axle and the chassis and to utilize such rotation of the brake drum in connection with inertia controlled means, to accomplish a powerful but selective retarding action, which is applied, only when needed, to lengthen the period of vibration of the chassis springs.

I claim:

1. In a device of the character set forth, an oscillatory brake drum, means to communicate vertical movement of an axle to said drum to oscillate it, a split brake band about the drum and inertia means operating upon either end of said brake band to contract it about the drum, said inertia means acting by direct pressure on the band.

2. In a shock absorber for vehicles, a rotatable brake drum, a split unattached band concentric with the drum, a lever actuated by the movement of the chassis of the vehicle and acting upon one end of the band to contact it with the drum, and an abutment contacting the other end of the band to prevent rotation with the drum while the lever is acting thereon.

3. In a device of the character set forth, an oscillatory brake drum, means to communicate vertical movement of an axle to said drum, a split unattached brake band about the drum and two members operating upon the two ends of the brake band to contract it about the drum, one of said members acting directly upon the band while the other is located to prevent rotation of the band with the drum.

4. In a device of the character set forth, an oscillatory brake drum, means to communicate relative movement of an axle and chassis to the drum to oscillate it, an unattached brake band normally spaced from the drum and to separate devices to contract said band, the primary device drawing said band toward the drum and the secondary device preventing rotation of the band with the drum.

5. In a shock absorber for vehicles, a rotatable brake drum, a split unattached brake band about said drum, a lever actuated by the movement of the chassis of the vehicle acting upon one end of the band to contract it on said drum, and an abutment contacting the other end of the band to prevent rotation with the drum after the lever has acted thereon.

6. In a shock absorber to restrain relative movement of the chassis and axle of a vehicle, a shaft rotatably supported on one portion of the vehicle, connections from said shaft to the other portion of the vehicle, a drum on said shaft, a contractible band about the drum, means to support said band spaced from the drum and means to contract the band on said drum, said contracting means comprising a balanced weight and a lever connected to said weight and contacting said band.

7. In a shock absorber for vehicles, a shaft, means to support said shaft for rotation on the chassis, an arm connecting said shaft with the axle of the vehicle, a drum on said shaft, a split contractible band about the drum, means to support the band spaced from and about the drum, an inertia weight, a bifurcated cam embracing the ends of the band, said cam being rocked by displacement of the inertia weight, and two stationary abutments also embracing the ends of the band.

8. In a shock absorber for vehicles, a brake drum, oscillated upon relative movement of the chassis and axle, a split brake band surrounding but normally spaced from said drum, and means to cause said brake band to restrain the oscillations of said drum at differential pressures, said means comprising an inertia weight, a bifurcated member embracing the end of the brake band and connected to said weight, and two abutments in the path of the brake band to prevent its movement with the drum.

9. In a shock absorber for vehicles, a brake drum, oscillated upon relative movement of the chassis and axle, a split brake band surrounding but normally spaced from said drum, and means to cause said brake band to restrain the oscillations of said drum at differential pressures, said means comprising an inertia weight, a bifurcated member embracing the end of the brake band and connected to said weight, and two abutments in the path of the brake band to prevent its movement with the drum, and means for adjusting brake band, abutments and bifurcated member simultaneously.

10. In a shock absorber adapted to control the motion of a spring mounted body, a rotatable drum journaled on the body, a brake band surrounding the drum, and inertia operated means acting selectively upon the ends of the brake band to lengthen the period of vibration of the body.

11. In a shock absorber adapted to control the motion of a spring mounted body relative to its support, a rotatable drum journaled on said body, linkage causing the drum to rotate in unison with the relative motion of the body and spring support, a brake band surrounding and normally free from the drum, and inertia operated means acting selectively upon the ends of the band to lengthen the period of vibration of the body.

12. In a shock absorber for spring supported vehicles, a rotatable drum actuated by relative movement of the chassis and axle, braking means coacting with the drum and operable to an equal degree in either direction, and inertia means for applying said braking means to increase the period of vibration of the vehicle springs. —

FRANK D. HOWE.